No. 867,887. PATENTED OCT. 8, 1907.
O. KUNTZEN.
MEANS FOR OPERATING FARE AND DISTANCE INDICATORS.
APPLICATION FILED OCT. 19, 1905.

UNITED STATES PATENT OFFICE.

OTTO KUNTZEN, OF BERLIN, GERMANY.

MEANS FOR OPERATING FARE AND DISTANCE INDICATORS.

No. 867,887.  Specification of Letters Patent.  Patented Oct. 8, 1907.

Application filed October 19, 1905. Serial No. 283,543.

*To all whom it may concern:*

Be it known that I, OTTO KUNTZEN, a subject of the King of Prussia, residing in Berlin, No. 58 Thaerstrasse, Germany, have invented an Improved Means for Operating Fare and Distance Indicators, of which the following is a specification.

This invention relates to a device for operating the indicating mechanism of fare and distance indicators for cabs or the like, and has for its object to provide a simple and inexpensive device that may be driven from the axle of the vehicle by a belt or chain or other suitable means, whereby the indicator will be positively and accurately operated and a manual tampering with the register will be prevented.

Figure 1:
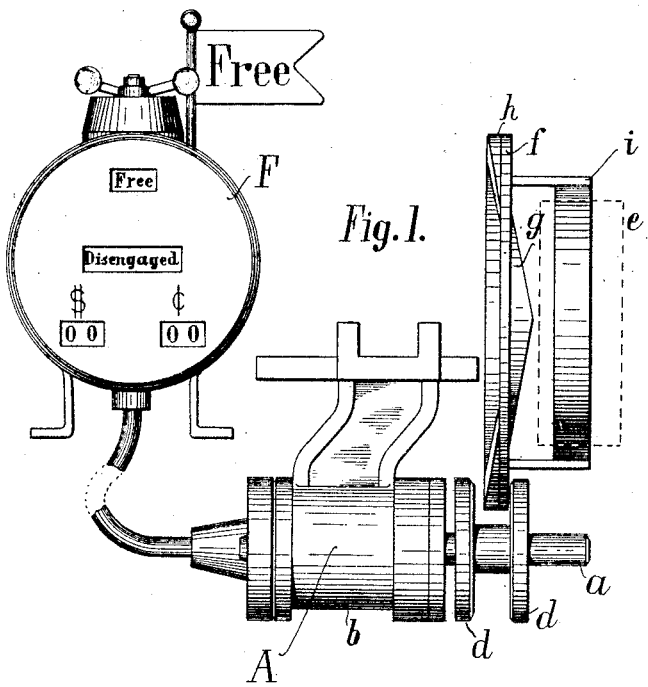
Figure 2:
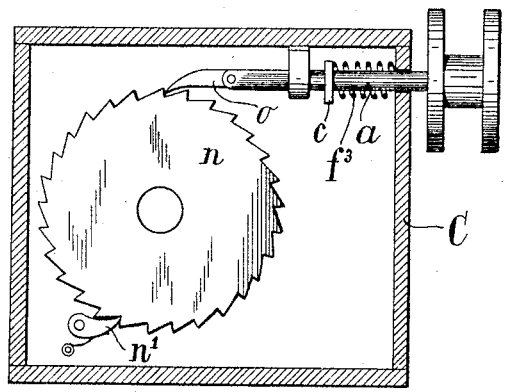

In the accompanying drawings Figure 1 shows a form of my invention applied to an air pump for operating the indicator mechanism and means for connecting the same with the axle of the vehicle; and Fig. 2 is a sectional view, showing a modification.

According to the example of construction shown in Fig. 1, the rod $a$ of the piston which slides in the cylinder $b$ of the air pump A has two shoulders $d, d$, between which revolves a cam wheel $f$, provided on both sides with the wedge-shaped cam surfaces $g$ and $h$. This wheel $f$ is driven from the axle of the vehicle in any known manner, for instance it is fixed to the hub $e$ of the wheel by means of a ring $i$, connected with the cam wheel $f$ in any suitable manner. As the cam wheel $f$ revolves the piston in the cylinder $b$ is drawn to the right by the cam surface $g$, while the cam surface $h$ acts during the return movement of the piston, and insures a positive to and fro movement to actuate any suitable indicator means F. In order to avoid a binding of the cam surfaces $g$ and $h$ between the pressure surfaces or shoulders $d, d$ on the sliding rod $a$ in consequence of running awry of the driving wheel, it is preferable to make the cam surface $h$ a little thinner than the surface $g$, so that the disk $f$ has some play between the pressure surfaces $d, d$.

In the form shown in Fig. 2 a gearing consisting of ratchet wheel $n$ and detent pawl $n'$ is employed instead of an air pump, to be moved by means of a pawl $o$, which is fastened with a pivot joint to the sliding rod $a$. This latter receives a reciprocating movement from the cam wheel $f$, or other means. On the rod $a$ between a side of the casing C and a collar $c$ may be located a helical spring $f^3$ in order to keep the pressure surface $d$ in contact with the revolving wheel $f$, thereby avoiding the sudden jarring and jolting of the parts. The transmission of the revolution from the ratchet wheel $n$ to the fare indicator, can, in this example, be effected with the aid of a flexible shaft or the like. In order to prevent the driver of the vehicle from lifting off the pawl $o$, the wheel $n$ and the cam $o$ are arranged in a closed box or casing C.

In neither of the modification described is it possible to displace the rod $a$ without turning the wheel so that the stop mechanism of the fare indicator will be set in action. The slight movement which the rod might possibly have in consequence of the above mentioned play between the wheel $f$ and the shoulder $d$ is not sufficient to drive the ratchet wheel $n$. If the contrivance is to serve for running a distance indicator, which tells the owner what distance the vehicle has covered daily, the distance indicator is best affixed to the construction, Fig. 1.

I claim as my invention

In combination with an indicator, a cam wheel adapted to be actuated from the wheel of a vehicle, a sliding rod provided with shoulders between which said cam wheel revolves and by means of which it imparts a positive to and fro movement to the rod in both directions, and means whereby such motion is transmitted from the rod to the indicator.

In witness whereof, I have hereunto signed my name in the presence of two subscribing witnesses.

OTTO KUNTZEN.

Witnesses:
JOHANNES HEIN,
HENRY HASPER.